H. BUERMANN.
TIRE HOLDER.
APPLICATION FILED MAY 6, 1912.
1,054,171.
Patented Feb. 25, 1913.
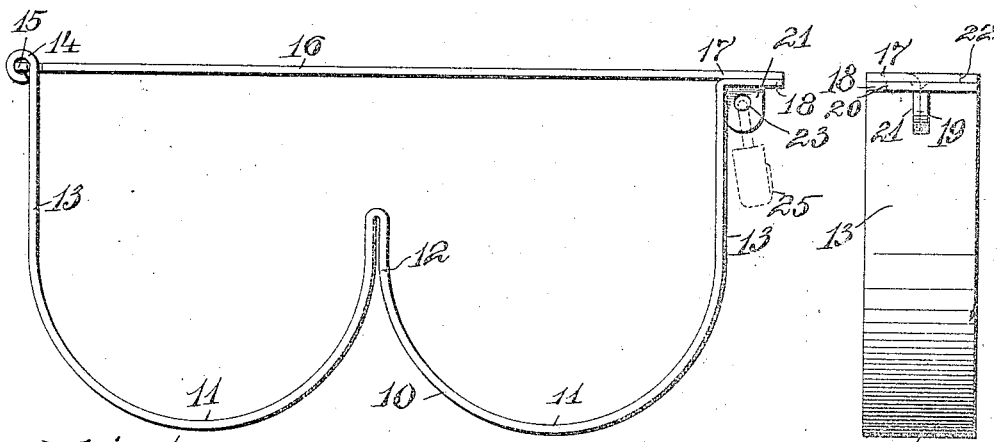
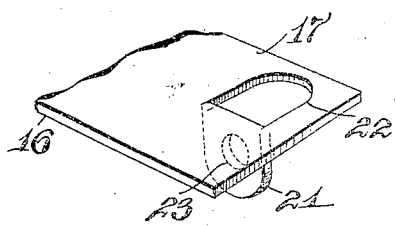
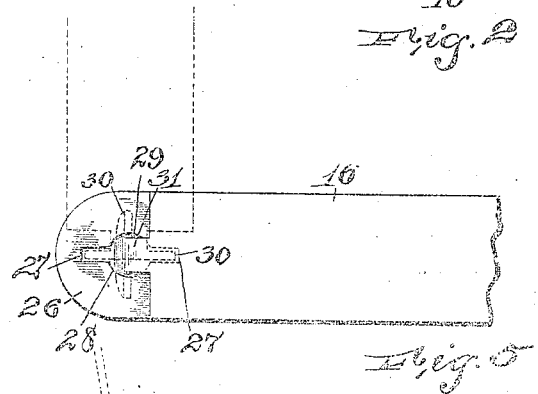
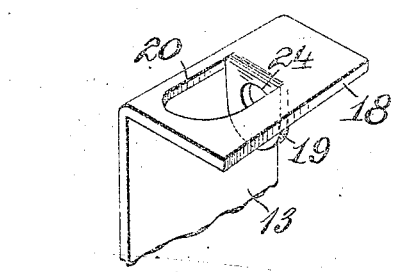
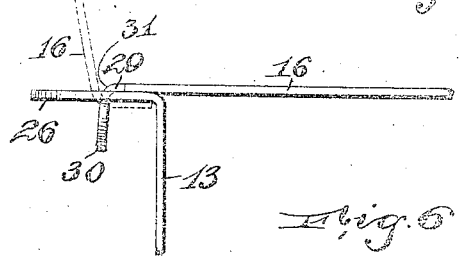
WITNESSES:
M. A. Johnson.
Albert B. Dey.
INVENTOR
Henry Buermann,
BY
Wm. H. Canfield,
ATTORNEY.

UNITED STATES PATENT OFFICE.

HENRY BUERMANN, OF NEWARK, NEW JERSEY.

TIRE-HOLDER.

1,054,171.

Specification of Letters Patent.  Patented Feb. 25, 1913.

Application filed May 6, 1912. Serial No. 695,356.

*To all whom it may concern:*

Be it known that I, HENRY BUERMANN, citizen of the United States, residing at Newark, in the county of Essex and State of New Jersey, have invented certain new and useful Improvements in Tire-Holders; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a tire holder which is adapted to receive a tire and hold it in place. The device is used usually on vehicles, such as automobiles, and extra tires are carried in these holders, the holder being adapted to be locked if necessary, although a quick opening fastening can be used if desired.

The invention consists of a tire holder which is formed from two strips of metal, one forming recesses to receive the tire, and the other forming a cover which spans the holder from one side to the other, the free end of the cover and the end of the side wall that engages it being formed into an interlocking pair of lips which are bent down from the strips and are adapted to lie side by side when the cover is shut, these lips being formed so that they will receive a fastening means such as a pad-lock, or any other securing means.

The invention also resides in a tire holder, the cover of which is detachable from its hinged end, after its free end has been released, so that the cover can be swung to one side.

The invention is illustrated in the accompanying drawing, in which—

Figure 1 is a side view of the tire holder, and Fig. 2 is an end view thereof. Fig. 3 is a perspective view of the free end of the cover, and Fig. 4 is a perspective view of a flange at the top of the side wall that is engaged by the end of the cover shown in Fig. 3. Fig. 5 is a top view of the hinged end of the tire holder showing a modified form of hinge connection, and Fig. 6 is a side view of part of the mechanism shown in Fig. 5.

The tire holder comprises a body portion made of a strip of metal 10 formed into tire-receiving recesses 11, two being shown in the drawing, but more or less can be used, the strip being bent up at 12 to form a partition between the recesses, the recesses terminating in the upwardly extending side walls 13 which project at least as high as the partition 12, but can be carried beyond as shown in the drawing, one side wall being bent into an eye 14 which receives a finger 15 formed on the cover 16 whereby a hinged connection for the cover is provided, the free end of the cover 17 co-acting in a manner to be hereinafter described with the free end of the second side wall to provide for fastening the cover shut. The second side wall has a flange 18 extending therefrom and on which the end 17 of the cover rests. The flange 18 is provided with a downwardly extending lip 19 struck up from the flange, thereby forming an opening 20, this opening being to one side of the center of the flange.

On the end 17 of the cover is formed a downwardly extending lip 21, this lip passing through the opening 20 and lying adjacent to the lip 19 when the cover is placed down on the flange 18. The lip 21 when struck up from sheet metal leaves an opening 22 which is on the side of the center opposite the side on which the opening 20 is situated so that when the cover is down on the flange, the solid portion of one of the faces, that is, either of the flange or the cover, covers the opening formed in the other body, which would not be the case if they were both struck up from the same side of the center. This makes a good finish, and when the lid is down on the flange there are no perforations apparent on a casual examination of the device, and the downwardly projecting lips are hidden from view when the tire holder is used at the bottom of tires. The two lips are provided with co-acting means to permit the use of a fastening means, usually in the shape of perforations 23 and 24 in the lips 21 and 19, respectively, these perforations being alined when the cover is shut to receive a fastening means such as a pad-lock 25 illustrated in Fig. 1 in dotted outline.

I may make the hinge connection of a detachable type as shown in Figs. 5 and 6, the first end wall 13 being formed on its end with a shelf 26 having a slot 27 therein, the slot having an enlarged central opening 28, the slot 27 extending longitudinally on the shelf. The cover 16 is recessed on its opposite sides as at 29 whereby a T-head 30 is formed, the T-head being bent down out of the plane of the cover, preferably at an obtuse angle thereto.

When the cover is to be withdrawn or to be installed, it is inserted as shown in dotted outline in Fig. 5, extending transversely so that the T-head 30 passes down through the slot 27, and after the T-head is below the shelf, the cover is swung to the position shown in full lines and the T-head then extends beyond the central opening 20 on both sides and is locked against removal from this position, except by turning the cover. The neck 31 of the T-head is approximately as wide as the central opening 28, being much narrower than the portion 27 of the slot so that the pivotal point of the cover is in the central portion 28 of the slot. When the cover is swung upward the T-head engages the bottom side of the shelf as shown in dotted outline in Fig. 6, thereby acting as a stop for the swing of the cover, the obtuse relation of the head and the cover permitting the cover to swing beyond the vertical so that it leans backward far enough to hold itself open. This joint permits the entire removal of the cover at its hinged joint, and provides for the ready and easy installation of new covers when necessary without the installation of an entire new holder.

Having thus described my invention, what I claim is:—

1. A tire holder comprising a strip of metal formed into tire-receiving recesses with upwardly extending side walls, one of the side walls having a horizontal flange, a cover hinged to the second side wall, said cover extending so as to rest on the flange, and downwardly projecting lips struck up from the flange and the cover, the lips being bent from opposite sides of the center so that when the cover and flange abut, the opening caused by the lip in one is closed by the surface of the other, the lip of the cover passing through the opening in the flange and lying alongside the lip of the flange, the lips being formed to receive a fastening means to lock them together.

2. A tire holder comprising a strip of metal formed into tire-receiving recesses with upwardly extending side walls, a shelf formed on the top of one of said walls, the shelf having a slot with an enlarged center, a cover having oppositely disposed recesses to form a T-head, the T-head being bent down with its neck in the enlarged center of the slot, the slot extending in a line substantially parallel with the swing of the cover, said T-head being adapted to pass through the slot when alined therewith and also acting to limit the swing of the cover, and means for fastening the free end of the cover and the second side wall.

3. A tire holder comprising a strip of metal formed into tire-receiving recesses with upwardly extending side walls, a shelf formed on the top of one of the walls, the shelf having a slot with an enlarged center, the slot extending longitudinally of the strip, that is, toward the other side wall, a cover having oppositely disposed recesses to form a T-head, the T-head being bent down and having its neck of approximately the same width as the enlarged center of the slot in the shelf, the T-head being formed transversely of the cover, the head portion being shorter than the slot in the shelf so that it can be inserted therein and then swung with its neck in the enlarged center of the slot, the T-head being adapted to limit the backward movement of the cover, and means for fastening the free end of the cover and the second side wall.

In testimony that I claim the foregoing I have hereunto set my hand this 26th day of April, 1912.

HENRY BUERMANN.

Witnesses:
 WM. H. CAMFIELD,
 M. A. JOHNSON.